Aug. 12, 1958

H. S. ORR 2,847,114

BELT CONVEYOR

Filed March 1, 1956

*INVENTOR.*
HOWARD S. ORR
BY
*Donald G. Dalton*

United States Patent Office 2,847,114
Patented Aug. 12, 1958

2,847,114

BELT CONVEYOR

Howard S. Orr, Pittsburgh, Pa., assignor to United States Steel Corporation, a corporation of New Jersey Application March 1, 1956, Serial No. 568,756

6 Claims. (Cl. 198—202)

This invention relates to a belt conveyor and is a continuation-in-part of my copending application Serial No. 307,760, filed September 4, 1952, now abandoned, which in turn is a continuation-in-part of my application Serial No. 217,989, filed March 28, 1951, now abandoned. In the past a great deal of trouble has been encountered in attempting to keep the belt centered on the conveyor pulleys. At present, flexible belts used on the conveyor depend upon rather highly crowned pulleys to secure sufficiently great distortion of the longitudinal fibers to obtain suitable tracking over the pulleys. This drastic deformation is detrimental to the life of the belt. Metallic belts cannot be used with crowned rolls on account of extremely short belt life, and therefore high belt tensions have been tried with such belts in order to obtain suitable tracking. The high tension causes wear and tear on the entire equipment and increases the power required to operate the system. In order to have the belt track in a suitable manner it is necessary for the bearings to be rigidly mounted so that they cannot deflect to any great extent under load. This increases the cost of installation. The load on the belt conveyors very seldom is absolutely uniform across the width of the belt and such eccentricity of load increases the tracking difficulties. If the bearings are not of sufficient rigidity to resist deflection under load one bearing will deflect a greater amount than the other, thus causing the belt to move off the pulleys. The problem of keeping belts centered is magnified when the slenderness ratio (ratio of the distance between pulleys to the width of the belt) is small.

It is an object of my invention to provide a belt conveyor which automatically centers the endless belt regardless of whether the belt material has a high or low modulus of elasticity.

Another object is to provide such a belt conveyor which does not depend upon crowned pulleys nor rigid bearing supports for the pulleys to secure proper tracking.

These and other objects will be more apparent after referring to the following specification and attached drawings, in which.

Figure 1:
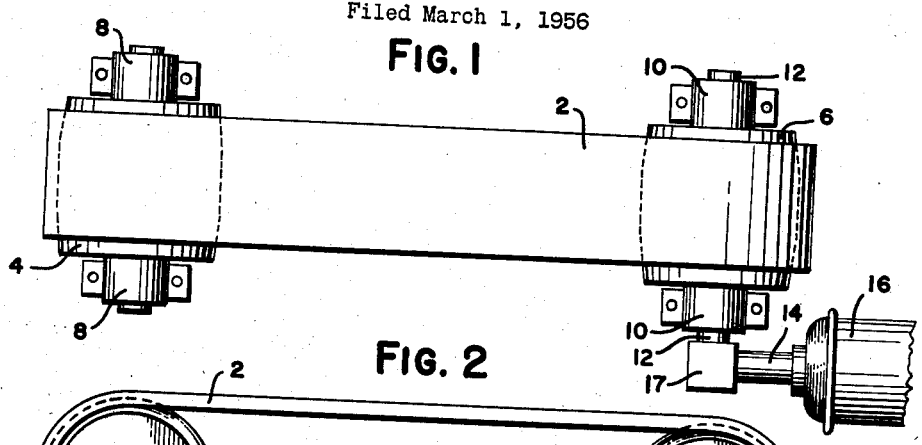
Figure 1 is a plan view of the belt conveyor of my invention.
Figure 2:
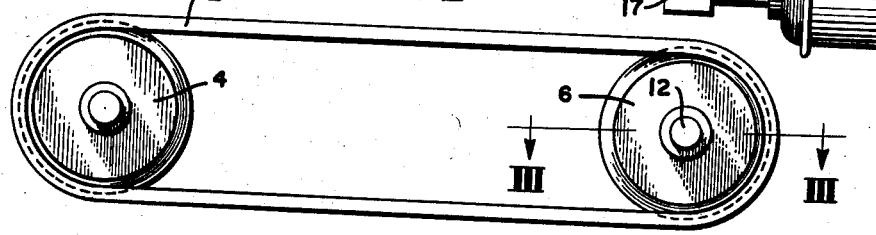
Figure 2 is a side elevation of Figure 1.
Figure 3:
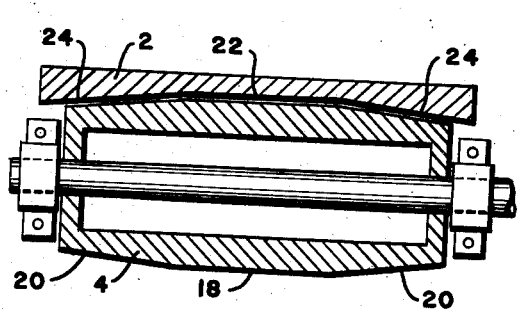
Figure 3 is a sectional view taken on the line III—III of Figure 2.

Referring more particularly to Figures 1 to 3 of the drawings, reference numeral 2 indicates an endless conveyor belt which passes around spaced apart pulleys 4 and 6. As shown, each of the pulleys 4 and 6 is solid but they may also be automatic centering rolls of the type disclosed in Lorig Patents No. 2,593,157 or No. 2,593,158, both dated April 12, 1952. It is sometimes desirable to use such rolls when the slenderness ratio is low, such as 10 to 1 or less. Rolls 4 and 6 are mounted in suitable bearings 8 and 10, respectively. One end of shaft 12 of roll 6 extends beyond the bearings 10 and is connected to shaft 14 of motor 16 either directly or through gear box 17. The pulley 4 has a central flat portion 18 of maximum diameter and portion 20 at each edge which gradually decreases in diameter from the flat portion 18 to the outer edges of the pulley. The inner surface of the belt 2 conforms in shape to the pulley 4, having a central flat portion 22 of maximum circumference and tapered side portions 24.

Figure 4:
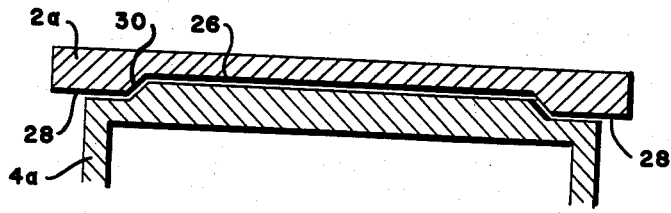
Figure 4 is a view, similar to Figure 3, showing another embodiment of my invention.
Figure 5:
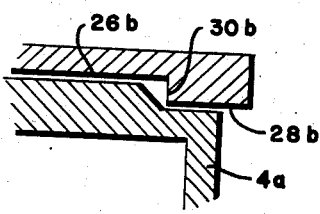
Figure 5 is a fragmentary view showing a slight modification of the pulley and belt arrangement of Figure 4.

In the embodiment of Figure 4 the belt 2a has a flat central portion 26 of maximum circumference and flat edge portions 28 of minimum circumference. Portions 26 and 28 are connected by a tapered shoulder 30. The outer surface of pulley 4a conforms in shape to the inner surface of the belt. If desired the flat surface of either the belt or pulley can be connected with a portion perpendicular thereto, but in all instances the shoulder on at least the belt or pulley must be tapered as shown. In other words, the shoulder 30b is such that the surface is perpendicular to the surfaces 26b and 28b as shown in Figure 5 with no change in shape of the roll 4a or the belt 2a can be shaped as shown with the connecting portion of the roll being radial. The width of the belt in any case may be either the same, greater or less than the width of the pulley or roll.

In any of the arrangements shown the pulley does not act as a guide since it is necessary that the belt be relatively free to move transversely so that it can readily climb on the inclined surface of the pulley. For best operation the flat central portion of the pulleys and the corresponding portion of the rolls should be at least 25% of the width of the pulley. For best operation the framework and bearing supports are relatively flexible. A flexibly mounted bearing is one where the total flexibility in the framework and supports is such that the shaft can move under load at least .005 inch with one of each pair of bearings being able to deflect a greater amount than the other in accordance with the load applied. Thus, in each of the embodiments shown there is a pair of spaced apart pulleys and endless belts passing around the pulleys with the outer surface of each of the pulleys having a wide central flat portion of maximum diameter and a portion adjacent each end of its flat portion gradually decreasing in diameter to its outer ends, and the belt having a normal cross section constructed so that the inner surface of the belt has a wide central flat portion of maximum circumference and portions adjacent each end of its flat portion gradually decreasing in circumference toward its outer end.

The operation of this device is as follows:

When the belt 2 passing over the pulley 4 is forced off center for any cause, such as change in the live load on the belt, camber in the belt, change in temperature of the belt or framework, or change in speed, the belt edge farthest from the center is contracted while the other edge is elongated. If the belt moves to the right as shown in Figure 3 the left half of the belt is tightened and the right half is loosened with the left hand bearing taking more load and the right hand bearing taking less load. This causes the axis of the belt section to tilt clockwise with respect to the pulley which is the proper direction for restoring the belt to the center pass line. Because the bearings are flexibly mounted the axis of the pulley will tilt counterclockwise with respect to the belt. In other words, the movement will be greater on the side where the greater load is applied to the pulley. This is also the proper direction for restoring the belt to the center pass line. Thus with the present construction of belt and pulley the belt will be returned to the

I claim:

1. A belt conveyor comprising a pair of spaced apart pulleys, an endless belt passing around said pulleys, the outer surface of each of said pulleys having a wide central flat portion of maximum diameter and portions adjacent each end of its flat portion gradually decreasing in diameter toward its outer ends, said belt having a normal cross section constructed so that the inner surface of said belt has a wide central flat portion of maximum circumference and portions adjacent each end of its flat portion gradually decreasing in circumference toward its outer ends, said belt being free to move transversely and radially outwardly on said pulleys under external forces, a shaft for each of said pulleys, and relatively flexibly mounted bearings located beyond the central flat portion of said pulley for supporting said shaft.

2. A belt conveyor comprising a pair of spaced apart pulleys, an endless belt passing around said pulleys, the outer surface of each of said pulleys having a wide central flat portion of maximum diameter and flat portions adjacent each edge, said belt having a normal cross-section constructed so that the inner surface of said belt has a wide central flat portion of maximum circumference and flat portions adjacent each edge, a tapered portion on at least one of said surfaces connecting the central flat portion to each edge flat portion, said belt being free to move transversely and radially outwardly on said pulleys under external forces, a shaft for each of said pulleys, and relatively flexibly mounted bearings located beyond the central flat portion of said pulley for supporting said shaft.

3. A belt conveyor comprising a pair of spaced apart pulleys, an endless belt passing around said pulleys, the outer surface of each of said pulleys having a wide central flat portion of maximum diameter and portions adjacent each end of its flat portion gradually decreasing in diameter toward its outer ends, said belt having a normal cross-section constructed so that the inner surface of said belt has a wide central flat portion of maximum circumference of a width at least as great as the width of the central flat portion of the pulleys and portions adjacent each end of its flat portion of less circumference than its central flat portion, said belt being free to move transversely and radially outwardly on said pulleys under external forces, a shaft for each of said pulleys, and relatively flexibly mounted bearings located beyond the central flat portion of said pulley for supporting said shaft.

4. A belt conveyor comprising a pair of spaced apart pulleys, an endless belt passing around said pulleys, the outer surface of each of said pulleys having a wide central flat portion of maximum diameter and portions adjacent each end of its flat portion gradually decreasing in diameter toward its outer ends, said belt having a normal cross-section constructed so that the inner surface of said belt has a wide central flat portion of maximum circumference and portions adjacent each end of its flat portion gradually decreasing in circumference toward its outer ends, said central flat portions having a width at least equal to 25% of the total width of the pulley, said belt being free to move transversely and radially outwardly on said pulleys, a shaft for each of said pulleys, and relatively flexibly mounted bearings located beyond the central flat portion of said pulley for supporting said shaft.

5. A belt conveyor comprising a pair of spaced apart pulleys, an endless belt passing around said pulleys, the outer surface of each of said pulleys having a wide central flat portion of maximum diameter and flat portions adjacent each edge, said belt having a normal cross-section constructed so that the inner surface of said belt has a wide central flat portion of maximum circumference and flat portions adjacent each edge, said central flat portions having a width at least equal to 25% of the total width of the pulley, a tapered portion on at least one of said surfaces connecting the central flat portion to each edge flat portion, said belt being free to move transversely and radially outwardly on said pulleys, a shaft for each of said pulleys, and relatively flexibly mounted bearings located beyond the central flat portion of said pulley for supporting said shaft.

6. A belt conveyor comprising a pair of spaced apart pulleys, an endless belt passing around said pulleys, the outer surface of each of said pulleys having a wide central flat portion of maximum diameter and portions adjacent each end of its flat portion gradually decreasing in diameter toward its outer ends, said belt having a normal cross-section constructed so that the inner surface of said belt has a wide central flat portion of maximum circumference of a width at least as great as the width of the central flat portion of the pulleys and portions adjacent each end of its flat portion of less circumference than its central flat portion, said central flat portions having a width at least equal to 25% of the total width of the pulley, said belt being free to move transversely and radially outwardly on said pulleys, a shaft for each of said pulleys, and relatively flexibly mounted bearings located beyond the central flat portion of said pulley for supporting said shaft.

References Cited in the file of this patent

UNITED STATES PATENTS

| | | |
|---|---|---|
| 889,342 | Snyder | June 2, 1908 |
| 1,290,894 | Bryan | Jan. 14, 1919 |
| 1,628,436 | Segrin | May 10, 1927 |

FOREIGN PATENTS

| | | |
|---|---|---|
| 7,108 | Austria | Mar. 26, 1902 |
| 1,079,573 | France | May 19, 1954 |